United States Patent [19]

Hörvallius

[11] 4,015,339
[45] Apr. 5, 1977

[54] MEASURING TOOL FOR FRAMEWORKS

[75] Inventor: Torgny William Hörvallius, Gavle, Sweden

[73] Assignee: Aktiebolaget SAMEFA, Stockholm, Sweden

[22] Filed: Nov. 3, 1975

[21] Appl. No.: 628,608

[52] U.S. Cl. .............................. 33/288; 33/180 AT
[51] Int. Cl.² ...................... G01B 5/25; G01B 11/27
[58] Field of Search .............. 33/158, 161, 180 AT, 33/181 AT, 193, 203.20, 264, 288

[56] References Cited

UNITED STATES PATENTS

| | | | |
|---|---|---|---|
| 1,670,509 | 5/1928 | Jung | 33/158 |
| 2,000,866 | 5/1935 | Smith | 33/288 |
| 2,575,194 | 11/1951 | Smith | 33/288 |
| 3,095,651 | 7/1963 | Luedicke, Jr. | 33/158 |
| 3,810,313 | 5/1974 | Hicks | 33/288 |
| 3,983,635 | 10/1976 | Jarman | 33/288 |

FOREIGN PATENTS OR APPLICATIONS

| | | | |
|---|---|---|---|
| 1,547,546 | 10/1968 | France | 33/288 |

Primary Examiner—Richard E. Aegerter
Assistant Examiner—Richard R. Stearns
Attorney, Agent, or Firm—Woodhams, Blanchard and Flynn

[57] ABSTRACT

A measuring tool for checking frameworks, comprising a fixed part intended to be suspended between two opposing sides of the framework, and a movable part displaceable in or on the fixed portion. Both parts have longitudinal scales readable against indexes, variations in the distance between the sides of the framework being reflected on the scale of the fixed part which has graduations twice as large as those on the scale of the movable part. Graduations of the scales are so arranged that when the movable part is adjusted with its scale showing against its index the same value as that read on the scale of the fixed portion against its index, the movable portion will always assume the same position in relation to the centerline between the sides of the framework.

13 Claims, 4 Drawing Figures

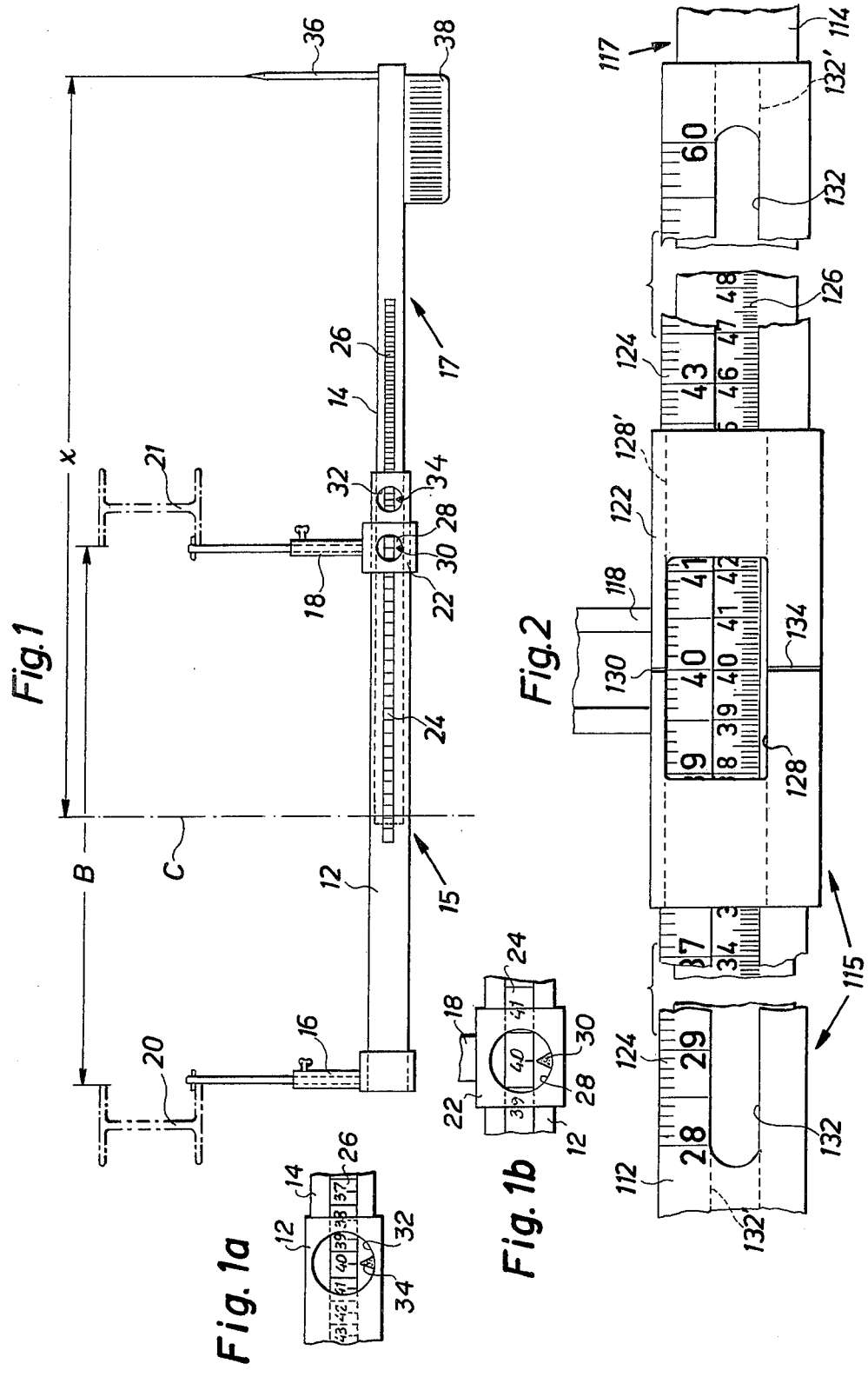

MEASURING TOOL FOR FRAMEWORKS

The present invention relates to measuring tools for checking frameworks, preferably chassis frames on vehicles, the measuring tool according to the invention comprising an adjustable measuring bar, with the help of which the position and straightness of the frame centreline can be reproduced outside the frame itself, and accurately studied. The centreline is thus conceived to be subjected to a parallel displacement from its true position, and this is done in an extremely simple way by means of the measuring tool according to the invention.

It is previously known to provide such a conceived parallel displacement of a chassis frame centreline with the help of a so-called frame gauge consisting of two mutually displaceable bars made as racks, which engage with at least one common intermediate pinion. In the relation to the latter the bars can each be extended the same distance in opposite directions, and if their ends are fitted between a pair of longitudinal beams, a sighting pin fixedly oriented in relation to the pinion can be arranged always to be located in the middle of the two beams. If a number of such gauges are mounted along a chassis frame and the same number of equally long rods are arranged commonly parallel and extending one each sighting pin so that they project outside the frame on one side of it, the free ends will thus lie along a line extending parallel with the true centreline of the chassis frame. With the aid of suitable sighting means it can be established, for example, whether the centreline is straight or not.

Known frame gauges with associated details as above are rather costly and difficult to use and the system is very prone to backlash, which reduces accuracy. The object of the invention is thus to accomplish an improved measuring tool of the kind in question, in which the above-mentioned drawbacks in similar earlier measuring devices have been obviated. The object is attained and a simple, reliable and cheap measuring tool for frames is provided by the tool according to the invention having been given the distinguishing features disclosed in the accompanying claims.

An embodiment of the invention will now be described for the purpose of exemplification, while referring to the attached drawing, wherein FIG. 1 schematically illustrates a measuring tool according to the invention, and how it is suspended and adjusted between the beams in a framework, FIGS. 1a and 1b show some important sections of FIG. 1 on a larger scale, and FIG. 2 is an enlarged detail view of a second embodiment of the invention.

As is apparent from FIG. 1, the embodiment of the measuring tool according to the invention shown there comprises a fixed part and a movable part, the former constituting a suspended part 15, which comprises a bar portion 12 and two holders or suspending means 16 and 18, by which the bar portion can be suspended between two opposing beams 20 and 21 incorporated in a framework. The movable part of the measuring tool constitutes an indicator part 17 and comprises a sliding portion 14 which is telescopically accommodated in the bar portion 12 of the suspended part 15, and is freely displaceable in it. Of the two holders, the holder 16 is fixedly arranged at one end of the bar portion 12, whereas the holder 18 is connected to a sleeve or slide 22 which is displaceable along the bar portion 12. Both holders 16 and 18 can have an arbitrary form and have suitably adjustable lengths so that the measuring tool can be suspeded as a unit in a horizontal position between the beams 20 and 21, approximately as shown in FIG. 1. The movable parts of the measuring tool are provided with conventional fixing or locking means not more closely shown, e.g. thumbscrews or the like, by which the tool is locked in is operative position to form a rigid unit.

The bar portion 12 is provided with a longitudinal scale 24 on its exterior, whereas the sliding portion 14 is provided with a longitudinal scale 26. The sleeve or slide 22 is provided with a window 28 through which the scale 24 can be read against an index 30, see FIG. 1a. In a corresponding manner the bar portion 12 in its turn is provided with a window 32 close to its free end, i.e. the end opposite the holder 16, and through this window the scale 26 on the sliding portion 14 is read against an index 34, see FIG. 1b.

The indicator part 17 also comprises a sighting pin 36 mounted on the free end of the sliding portion 14, where there is also arranged a scale 38 intended for optical measurements, as is schematically shown in FIG. 1.

According to FIG. 1 the measuring tool is thus hung up in its suspended part 15 by means of the two suspending means 16 and 18 between two beams 20 and 21 incorporated in a framework, of which the central plane between the beams is denoted by C, while the inside distance between the beams is denoted by B. Consequent on the tool being hung up between the beams, the index 30 of the slide 22 will indicate a definite numerical value on the scale 24 of the bar portion 12, see FIG. 1a. According to the invention, the sliding portion 14 shall now be displaced to a position in which it shows, on the index 34 integral with the bar portion 12, the same numerically representative scale division as the value on scale 26, see FIG. 1b. The distance between the central plane C of the frame and the sighting pin 36 has then a definite value $x$, see FIG. 1. When the measuring tool in its entirety is moved along the beams 20 and 21, the distance $x$ must be the same the whole time, if the sighting pin 36 is continuously to represent a point on the "offset" centre line between the beams, even if the distance B between the beams varies. It will easily be appreciated hereby that if the distance B varies by a certain amount, e.g. $\delta$, resulting in the slide 22 being displaced the same distance $\delta$ along the bar portion 12, the slide portion 14 must be displaced in relation to the bar portion by a distance which is only half as great, i.e. $\delta/2$, for the distance $x$ to be unaltered. As a consequence the distance between two scale marks on the scale 24 must be twice as large as the distance between two corresponding similarly denoted scale marks on scale 26. The absolute value of the scale magnitudes, i.e. where the scales have their zeros, has no importance, but for practical reasons the scale 24 can be suitably graduated such that the true value read off therefrom against the index 30 gives half the frame width B/2, for example, in centimeters, i.e. generally speaking the distance from the index to the central plane C.

A simple numerical example illustrates the relationships. If the distance B between the beams 20 and 21 is such that index 30 is against the figure 40 on the scale 24, which from the above means that the distance B is 80 cm, the sliding portion 14 is set in relation to the bar portion 12 so that the index 34 on the latter points against the same figure 40 on the scale 26. The sighting pin 36 is thus at a definite distance $x$ from the central plane C. If the measuring tool is now moved along the beams to a point where the distance between these has increased by 2 cm, for instance, the slide 22 must be extended outwards 2 cm to retain suspension but, on the other hand, the sliding portion 14 has to be withdrawn 1 cm only from the bar portion 12 to keep distance $x$ constant, as this is the distance from the sighting pin to the central plane C, which has thus only been moved 1 cm in relation to the frame beams. In order that the indexes 30 and 34 shall still point to similarly denoted scale markings, in this case 41, the distance between the scale markings on 24 must thus be twice as large as the distance between those on the scale 16.

In the embodiment according to FIG. 1 there are two separate reading windows with indexes, and it is further necessary to make the one scale, namely 24, with a rising number series, while the scale 26 must be made with a falling number series. A simplified, more practical embodiment of the invention, retaining its basic principles, is shown in FIG. 2 illustrating the essential parts of this second embodiment, while the rest of the measuring tool is made generally as the measuring tool according to FIG. 1.

In the embodiment according to FIG. 2, the bar portion 112 is, as before, incorporated in the suspended part 115 of the measuring tool and provided with a scale 124, the latter appearing in a window 128 arranged in the slide or sleeve 122 of the movable holder 118 accommodating the bar portion 112, reading being carried out against an index 130. In this case, however, a very elongated window 132, corresponding to the window 32 according to FIG. 1, is taken up in the bar portion 112, and through this window, which in actual fact consists of a long slot in the bar portion, the scale 126 appears, which is arranged on the telescopically accommodated sliding portion 114 of the measuring tool. This scale will always appear through the window 128 in the sleeve 122 because of the great length of the slot 132, for reading against an index 134 located exactly opposite the index 130. Both scales extend adjacent each other, and as both indexes 130 and 134 are arranged directly opposite each other, the scales can actually be read directly against each other as well.

It is readily appreciated that the measuring tool according to FIG. 2 functions according to the same principle as the tool according to FIG. 1, i.e. when it is suspended between a pair of beams in a framework, the scale 124 gives against the index 130 a measurement corresponding to half the frame width, and if the sliding portion 114 is set, as before, so that the same measurement numeral on its scale 126 is located against the index 134 (or directly against the corresponding scale marking on the scale 124 of the bar portion 112), the sighting pin (not shown), arranged on the free end of the sliding portion 114, will also in this case be at a distance, which is always the same, from the central plane of the frame, independent of whether the frame is found to have different widths at the measuring locations. In other words, the movable sliding portion 114 keeps still the whole time in relation to the central plane.

With regard to the practical structural embodiment of the measuring tool according to the invention, both the bar portion and the sliding portion as well as the movable holder slide can be made from suitable light metal sections, e.g. square tubes. In the embodiment according to FIG. 2, both the bar portion 112 and the sleeve 122 can be produced from an extruded U-profile with turned-in edges, the opening or slot between these edges forming the necessary window for the scales, as indicated at 128' and 132' in FIG. 2. In this case the windows will be continuous along the whole of the sleeve 122 and the bar portion 112.

I claim:

1. In a measuring tool for checking frameworks, especially a vehicle chassis frame, by illustrating the position and straightness of the frame centreline in a position offset to the frame, the tool including a fixed part and a movable part, the fixed part including a suspended part comprising a bar portion and holders of which at least one is mounted for movement along the bar portion, and by which the suspended part is arranged to be suspended in a fixed position between two opposing sides of the frame to be checked, the movable part of the measuring tool including an indicator part comprising a sliding portion mounted for longitudinal movement with respect to the bar portion of the suspended part, the improvement comprised in that:

the suspended part and indicator part of the measuring tool are each provided with a length scale formed with uniform graduations between the scale markings, an index fixed with respect to the movable holder, said scale of said suspended part being formed on said bar portion thereof and arranged for reading against said index, thereby reflecting alterations in the distance between the sides of the frame being checked and consequently alterations in the position of the frame centreline, a second index fixed with respect to said suspended part, said scale of said indicator part being formed on said sliding portion thereof and arranged for reading against said second index, the scale graduations of said bar portion scale being twice as large as those of said sliding portion scale, whereby said alteration in frame sides distance and frame centreline position, changing said bar portion scale reading by a given number of graduations, can be compensated by an appropriately directed shift of said sliding portion by the same number of graduations of its scale, to leave unchanged the positions of said centreline and the sliding portion with respect to each other.

2. A measuring tool as claimed in claim 1, in which said movable holder comprises a slide arranged slidably and adjustably on said bar portion of said suspended part, whereas said slide portion of said indicator part comprises an elongated member telescopically accommodated in said bar portion.

3. A measuring tool as claimed in claim 2, in which the first-mentioned said index is filled on said slide and said bar portion scale is arranged for reading against said first-mentioned index, whereas said second index is on said bar portion and said scale of said sliding portion is arranged for reading thereagainst.

4. A measuring tool as claimed in claim 2, in which said slide of said movable holder includes a window through which at least one of said scales appears.

5. A measuring tool as claimed in claim 2, in which both said bar portion and said sliding portion, as well as said slide of said movable holder, are metal members of substantially constant cross-sectional profile.

6. In a measuring tool for checking frameworks, especially a vehicle chassis frame, by illustrating the position and straightness of the frame centreline in a position offset from said frame, such tool including a fixed part and a movable part, said fixed part including a suspended part comprising a bar portion and holders of which at least one is mounted for movement along said bar portion, and by which said suspended part is arranged to be suspended in a fixed position between two opposing sides of said frame to be checked, said movable part of said measuring tool including an indicator part comprising a sliding portion mounted for longitudinal movement with respect to said bar portion of said suspended part, the improvement comprised in that:

said suspended part and said indicator part of said measuring tool are each provided with a length scale formed with uniform graduations between the scale markings, an index fixed with respect to said movable holder, the scale of said suspended part being formed on said bar portion thereof and arranged for reading against said index, thereby reflecting alterations in the distance between the sides of said frame being checked and consequently alterations in the position of the frame centreline, a second index also fixed with respect to said movable holder, the scale of said indicator part being formed on said sliding portion thereof and arranged for reading against said second index, the scale graduations of said bar portion scale being twice as large as those of said sliding portion scale, whereby a said alteration in frame sides distance and frame centreline position changing said bar portion scale reading by a given number of graduations can be compensated by an appropriately directed shift of said sliding portion by the same number of graduations of its scale, to leave unchanged the positions of said centreline and sliding portion with respect to each other.

7. A measuring tool as claimed in claim 6, in which said movable holder comprises a slide arranged slidably and adjustably on said bar portion of said suspended part, said slide portion of said indicator part comprising an elongate member telescopically accommodated in said bar portion.

8. A measurng tool as claimed in claim 7, in which the first-mentioned said index is provided on said slide, the scale of said bar portion being arranged for reading against said slide supported index, and including a slot-like longitudinal window formed in said bar portion, said second index also being carried by said slide.

9. A measuring tool according to claim 8, in which said first and second indexes, both on said slide, are aligned with each other transversely of said slide, the scale of said sliding portion also being readable through said longitudinal window directly against the scale markings on said scale of said bar portion.

10. A measuring tool as claimed in claim 7, in which said slide of said movable holder includes a window, at least one of said scales appearing through said window.

11. A measuring tool as claimed in claim 7, in which both said bar portion and said sliding portion, as well as said slide of movable holder, are metal members of substantially constant cross-sectional profile.

12. A measuring tool as claimed in claim 7, in which said slide of said movable holder has a cross-sectional configuration in the form of a U with turned-in edges, the slot between said edges forming a window in said slide.

13. A measuring tool as claimed in claim 6, in which said bar portion of said suspended part has a cross-sectional configuration in the form of a U with turned-in edges, the slot between said edges forming a window in the bar portion.

* * * * *

UNITED STATES PATENT AND TRADEMARK OFFICE
CERTIFICATE OF CORRECTION

PATENT NO. : 4 015 339
DATED : April 5, 1977
INVENTOR(S) : Torgny William Hörvallius It is certified that error appears in the above-identified patent and that said Letters Patent are hereby corrected as shown below:

Column 4, line 55; change "filled" to ---fixed---.

Signed and Sealed this

Eighteenth Day of April 1978

[SEAL]

Attest:

RUTH C. MASON
Attesting Officer

LUTRELLE F. PARKER
Acting Commissioner of Patents and Trademarks